(12) United States Patent
Ballantyne

(10) Patent No.: US 8,060,041 B2
(45) Date of Patent: Nov. 15, 2011

(54) ADAPTIVE RECEIVER FOR WIRELESS COMMUNICATION DEVICE

(75) Inventor: Gary John Ballantyne, Christchurch (NZ)

(73) Assignee: QUALCOMM, Incorporated, San Diego, CA (US)

( * ) Notice: Subject to any disclaimer, the term of this patent is extended or adjusted under 35 U.S.C. 154(b) by 615 days.

(21) Appl. No.: 11/352,487

(22) Filed: Feb. 9, 2006

(65) Prior Publication Data

US 2007/0184811 A1    Aug. 9, 2007

(51) Int. Cl.
*H04B 17/02*     (2006.01)
*H04B 1/16*     (2006.01)

(52) U.S. Cl. .................................... 455/133; 455/343.2

(58) Field of Classification Search ............... 455/550.1, 455/574, 132, 133, 134, 135, 136, 232.1, 455/234.1, 234.2, 285, 302, 323, 324, 343.1, 455/343.2
See application file for complete search history.

(56) References Cited

U.S. PATENT DOCUMENTS

| | | | |
|---|---|---|---|
| 5,559,838 A | 9/1996 | Nakagoshi | |
| 7,346,136 B1 * | 3/2008 | Aiello ............................ | 375/347 |
| 7,444,166 B2 | 10/2008 | Sahota | |
| 2003/0081694 A1 | 5/2003 | Wieck | |
| 2003/0190924 A1 * | 10/2003 | Agashe et al. ................. | 455/522 |
| 2005/0130713 A1 * | 6/2005 | Simpson et al. .............. | 455/574 |
| 2005/0253663 A1 | 11/2005 | Gomez et al. | |
| 2006/0009177 A1 * | 1/2006 | Persico et al. ................ | 455/143 |
| 2006/0194564 A1 | 8/2006 | Hokimoto | |
| 2007/0082716 A1 * | 4/2007 | Behzad et al. ................. | 455/574 |

FOREIGN PATENT DOCUMENTS

| | | |
|---|---|---|
| EP | 0366485 | 5/1990 |
| EP | 0777334 | 6/1997 |
| GB | 2316514 | 2/1998 |
| GB | 2353673 | 2/2001 |
| JP | 2000252896 | 9/2000 |
| JP | 2001511321 | 8/2001 |
| JP | 2005295348 | 10/2005 |
| WO | 2005013637 | 2/2005 |
| WO | 2006124550 | 11/2006 |

OTHER PUBLICATIONS

"A Low-Power Highly Digitized Receiver for 2.4-GHz-Band GFSK Applications"; Bergveld, et al., IEEE Transactions on Microwave Theory and Techniques, vol. 53, No. 2, Feb. 2005.
International Search Report-PCT/US07/061838, International Search Authority-European Patent Office-Feb. 5, 2007.
Written Opinion-PCT/US07/061838, International Search Authority-European Patent Office-Feb. 5, 2007.
European Search Report—EP11158107—Search Authority—Munich—Apr. 27, 2011.
European Search Report—EP11158109—Search Authority—Munich—Apr. 18, 2011.

* cited by examiner

*Primary Examiner* — Nguyen Vo
(74) *Attorney, Agent, or Firm* — Kenyon Jenckes; Ramin Mobarhan

(57) ABSTRACT

In general, the disclosure is directed to techniques for combining a high performance receiver and a low power receiver within a wireless communication device (WCD) to reduce power consumption. Upon receiving a signal from a base station, a controller within the WCD detects one or more channel conditions of a radio frequency (RF) environment between the base station and the WCD. The controller selects a high performance receiver to process the received signal when the RF environment is unfavorable and selects a low power receiver to process the received signal when the RF environment is favorable. In this manner, the WCD implements an adaptive receiver that adapts its receiver structure according to RF channel conditions.

40 Claims, 5 Drawing Sheets ced signal with a probability of only approximately ten percent. Therefore, the techniques described in this disclosure may substantially reduce power consumption within the WCD by typically processing the received signal with a low power receiver.

ADAPTIVE RECEIVER FOR WIRELESS COMMUNICATION DEVICE

TECHNICAL FIELD

The disclosure relates generally to wireless communication devices and, more particularly, to receivers for wireless communication devices.

BACKGROUND

A widely used technique for wireless communication is code division multiple access (CDMA) signal modulation. In a CDMA system, multiple communication signals are simultaneously transmitted between base stations and wireless communication devices (WCDs) over a spread spectrum radio-frequency (RF) environment. The signals are subject to conditions present within the RF environment between a base station and a WCD.

Receivers within WCDs are typically designed to handle worst case scenario RF environment conditions. These high performance receivers are designed in accordance with communication standards that define the worst case scenario conditions. In this way, WCDs are capable of receiving unfavorable signals from base stations and accurately demodulating the received signals. For example, the unfavorable signals may include weak signals, noisy signals, and signals degraded by strong jammers.

Although high performance receivers perform effectively in undesirable RF environment conditions, the receivers consume large amounts of power. Conserving power in a mobile WCD is a paramount concern, as the WCD is typically powered by limited battery resources. In addition, high performance receivers rarely encounter RF conditions that are as unfavorable as those defined by the communication standards. This compromises the design of the receiver, which must simultaneously handle the rare worst case scenario conditions and also be economical in power consumption.

SUMMARY

In general, the disclosure is directed to techniques for combining a high performance receiver and a low power receiver within a wireless communication device (WCD) to reduce power consumption. Upon receiving a signal from a base station, a controller within the WCD detects one or more channel conditions of a radio frequency (RF) environment between the base station and the WCD. The controller selects a high performance receiver to process the received signal when the RF environment is unfavorable and selects a low power receiver to process the received signal when the RF environment is favorable. In this manner, the WCD implements an adaptive receiver that adapts its receiver structure according to RF channel conditions.

As an example, a received signal may be initially processed with a high performance receiver of a WCD while a controller within the WCD detects conditions of the RF environment. The controller may configure the low power receiver while the high performance receiver processes the received signal. When the RF environment is favorable, e.g., as determined by one or more channel condition indicators, the controller performs a hand-off from the high performance receiver to the low power receiver. The controller then continues to detect conditions of the RF environment and may perform a hand-off back to the high performance receiver if the conditions in the RF environment become unfavorable.

The WCD rarely encounters RF environment conditions as undesirable as those for which the high performance receiver is designed to handle. For example, the controller within the WCD may select the high performance receiver to process the received signal with a probability of only approximately ten percent. Therefore, the techniques described in this disclosure may substantially reduce power consumption within the WCD by typically processing the received signal with a low power receiver.

In one embodiment, a method comprises receiving a wireless signal, evaluating at least one channel condition associated with the wireless signal, and selecting one of a high performance receiver and a low power receiver to process the received signal based on the evaluation.

In another embodiment, a wireless communication device (WCD) comprises an antenna that receives a wireless signal, a high performance receiver coupled to the antenna, a low power receiver coupled to the antenna, and a controller. The controller evaluates at least one channel condition associated with the wireless signal, and selects one of the high performance receiver and the low power receiver to process the received signal based on the evaluation.

In a further embodiment, a WCD comprises an antenna that receives a wireless signal, a high performance zero intermediate frequency (ZIF) receiver coupled to the antenna, a low power low intermediate frequency (LIF) receiver coupled to the antenna, a RAKE demodulator, and a controller. The RAKE demodulator has a first plurality of fingers coupled to an output of the high performance ZIF receiver and a second plurality of fingers coupled to an output of the low power LIF receiver. The controller evaluates at least one channel condition associated with the wireless signal, selects the low power LIF receiver to process the received signal when the channel condition is favorable, and selects the high performance ZIF receiver to process the received signal when the channel condition is unfavorable.

The details of one or more embodiments are set forth in the accompanying drawings and the description below. Other features, objects, and advantages will be apparent from the description and drawings, and from the claims.

DETAILED DESCRIPTION

Figure 1:
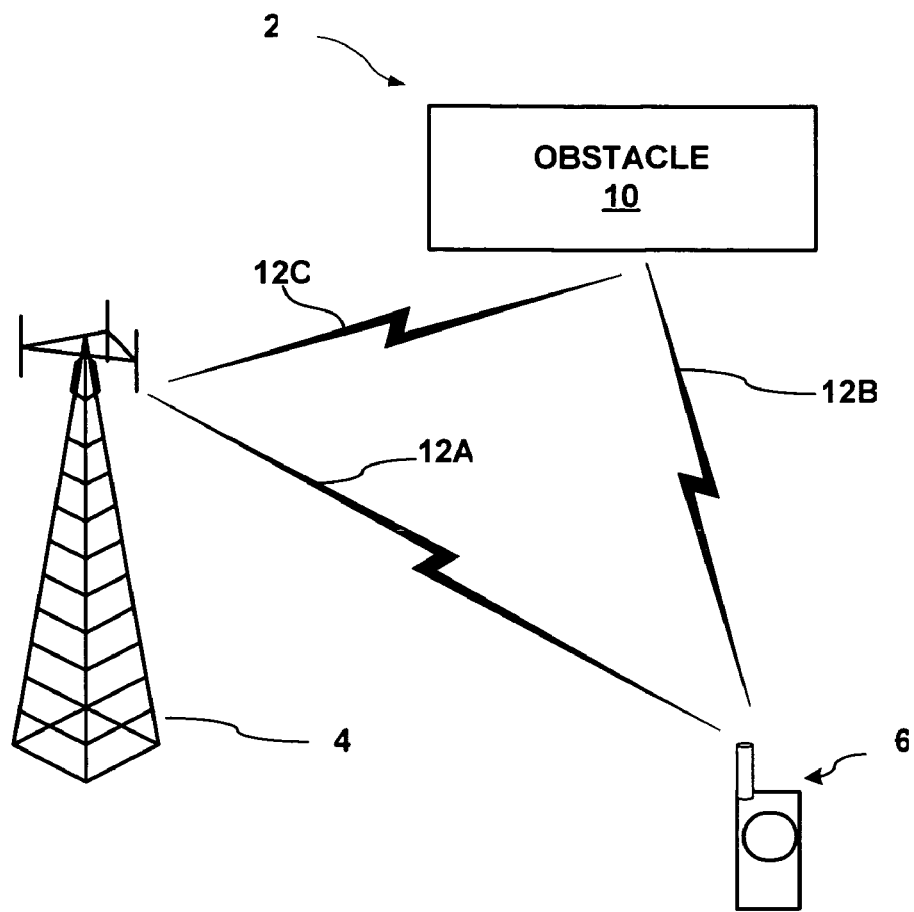
FIG. 1 is a block diagram illustrating an exemplary wireless communication system.

FIG. 1 is a block diagram illustrating an exemplary wireless communication system 2. As shown in FIG. 1, system 2 includes a base station 4 that transmits and receives wireless communication signals to and from a wireless communication device (WCD) 6 via an antenna. The wireless signals may follow one or more paths 12A, 12B, 12C through a radio-frequency (RF) environment. The signals are subject to varying channel conditions present within the RF environment between base station 4 and WCD 6. For example, channel conditions may include signal fading or interference that result in weak signal strength or noise. As will be described, WCD 6 includes a high performance receiver designed to handle unfavorable RF environment conditions, i.e., conditions characterized by weak signal strength or excessive noise. In addition, WCD 6 includes a low power receiver designed to handle favorable RF environment conditions with reduced power consumption.

System 2 may be designed to support one or more wireless communication technologies such as code division multiple access (CDMA), frequency division multiple access (FDMA), time division multiple access (TDMA), or orthogonal frequency divisional multiplexing (OFDM). The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCMA operation. In addition, high data rate (HDR) technologies such as cdma2000 1x EV-DO may be used. Application to CDMA and WCDMA environments may be described in this disclosure for purposes of illustration. However, the techniques described in this disclosure should not be considered limited in application, and may be used in a variety of wireless communication environments.

WCD 6 may take the form of a mobile radiotelephone, a satellite radiotelephone, a wireless communication card incorporated within a portable computer, a personal digital assistant (PDA) equipped with wireless communication capabilities, or the like. Base station 6 may include a base station controller (BSC) that provides an interface between the base station and a public switched telephone network (PSTN), data network, or both. WCD 6 may receive signals from base station 4 via a first path 12A, as well as signals via a second path 12B, 12C caused by reflection of the signal from an obstacle 10. Obstacle 10 may be any structure proximate to WCD 6 such as a building, bridge, car, or even a person. The transmitted signals illustrate a multipath environment in which multiple received signals carry the same information, but may have different amplitudes, phases and time delays.

The high performance receiver within WCD 6 is designed in accordance with communication standards that define performance requirements for worst case scenario conditions. In this way, WCD 6 is capable of receiving signals from base station 4 and accurately demodulating the received signals during unfavorable channel conditions. For example, the unfavorable signals may include weak signals, noisy signals, and signals influenced by the presence of strong jammers. Although the high performance receiver may perform effectively in undesirable RF environment conditions, the high performance receiver consumes large amounts of power. Conserving power in WCD 6 is a paramount concern, as WCD 6 is typically powered by limited battery resources. In addition, the high performance receiver rarely encounters RF conditions that are as unfavorable as those defined by the communication standards.

In order to substantially reduce power consumption within WCD 6, the techniques described herein couple the high performance receiver and the low power receiver to each other via a switch that enables either one of the receivers to process received communication signals. Upon receiving a signal, a controller within WCD 6 detects channel conditions in the RF environment, e.g., using one or more channel condition indicators. The channel condition indicators may include a received signal strength indication (RSSI), an in-band noise estimate, and jammer detection. The controller then selects the high performance receiver to process the received signal when the RF environment is unfavorable and selects the low power receiver to process the received signal when the RF environment is favorable. Because unfavorable RF conditions are rarely encountered, power consumption may be substantially reduced within the WCD by typically processing the received signal with the low power receiver.

Figure 2:
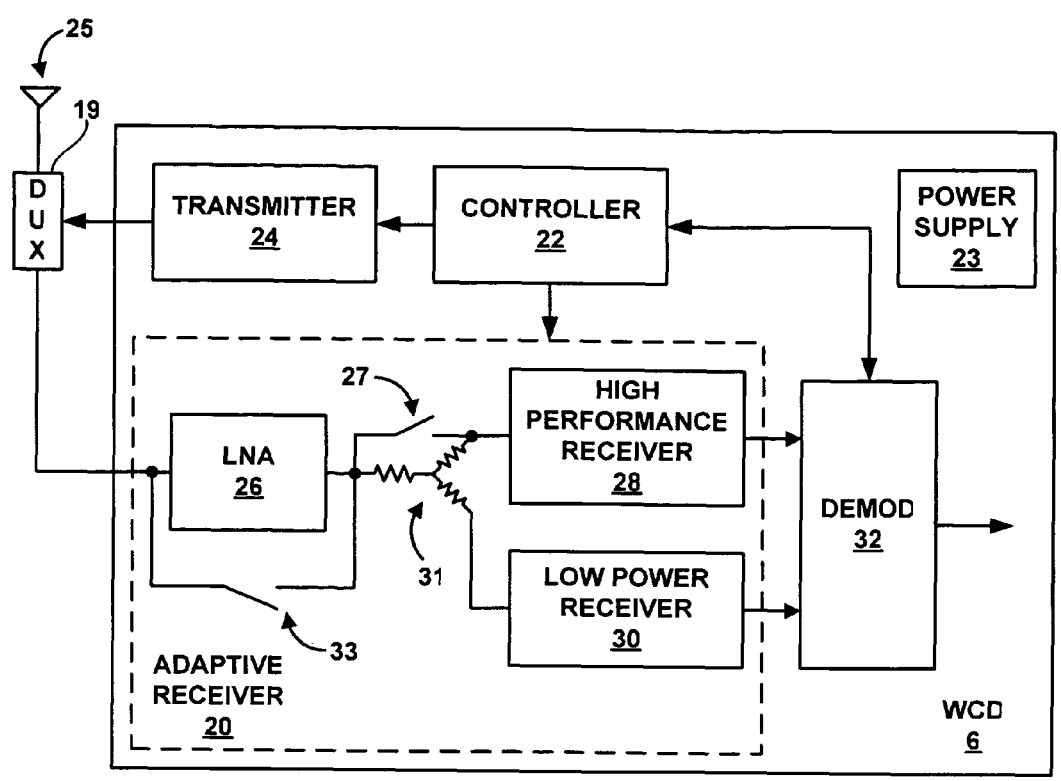
FIG. 2 is a block diagram illustrating a WCD incorporating an adaptive receiver.

FIG. 2 is a block diagram illustrating a WCD 6 incorporating an adaptive receiver 20, in accordance with an embodiment of this disclosure. In the example of FIG. 2, WCD 6 includes a controller 22 capable of evaluating channel conditions and configuring adaptive receiver 20 to process communication signals received by an antenna 25 based on the channel conditions. As shown in FIG. 2, WCD 6 also includes a power supply 23 and a transmitter 24 coupled to antenna 25. Power supply 23 typically will be battery-powered, although the techniques described herein may be applicable to WCDs that are not battery-powered.

In some embodiments, controller 22 may form part of a mobile station modem (MSM). Various components of WCD 6, such as controller 22, may be realized in hardware, software, firmware, or a combination thereof. For example, such components may operate as software processes executing on one or more microprocessors or digital signal processors (DSPs), or be embodied by one or more application specific integrated circuits (ASICs), one or more field programmable gate arrays (FPGAs), or other equivalent integrated or discrete logic circuitry. If implemented in software, certain aspects of the techniques described in this disclosure may be embodied as instructions stored on a computer-readable medium, such as random access memory (RAM) such as synchronous dynamic random access memory (SDRAM), read-only memory (ROM), non-volatile random access memory (NVRAM), electrically erasable programmable read-only memory (EEPROM), FLASH memory, or the like.

Transmitter 24 and adaptive receiver 20 are coupled to antenna 25 via a duplexer (DUX) 19. Adaptive receiver 20 of WCD 6 includes a high performance receiver 28 and a low power receiver 30 that are coupled to each other via a switch 27. In the illustrated embodiment, switch 27 provides a direct path from low noise amplifier (LNA) 26 to high performance receiver 28 when the switch is in a first switch state, e.g., closed. When switch 27 is in a second switch state, e.g., open, LNA 26 is coupled to both high performance receiver 28 and low power receiver 30 via resistive power splitter 31. Hence, antenna 25 can be selectively coupled to high performance receiver 28 and low power receiver 30 via the common LNA 26.

WCD 6 also may include a bypass path around LNA 26. The bypass path includes a bypass switch 33. When bypass switch 33 is closed, antenna 25 is coupled directly to switch 27 or resistive power splitter 31, eliminating LNA 26 from the receive path. When bypass switch 33 is open, signals from antenna 25 pass through LNA 26 before application to switch 27 or resistive power splitter 31. In other embodiments, WCD 6 may include one or more additional receivers with separate antennas to allow for diversity reception. For example, WCD 6 may comprise an additional low power receiver substantially similar to low power receiver 30. The additional low power receiver may be coupled to an additional antenna to permit diversity reception.

In the example of FIG. 2, high performance receiver 28 may comprise a zero intermediate frequency (ZIF) receiver. A ZIF receiver converts the frequency of an incoming radio frequency signal directly to a baseband frequency for demodulation with no intermediate frequency conversion. In some cases, high performance receiver 28 may not comprise a ZIF receiver. In either case, however, high performance receiver 28 preferably exhibits high sensitivity, i.e., the ability to detect a weak signal, and high linearity, i.e., the ability to detect a weak signal in the presence of a large unwanted signal. In this manner, high performance receiver 28 may be designed to provide good performance over a range of channel conditions, including poor channel conditions. However, high performance may come at the cost of a high rate of power consumption.

Low power receiver 30 may comprise a low intermediate frequency (LIF) receiver suitable for low power operations. For example, low power receiver 30 may comprise a LIF receiver similar to those commonly used in Bluetooth receivers. A LIF receiver converts the frequency of an incoming radio frequency signal to a low intermediate frequency and then converts the low intermediate frequency to a baseband frequency for demodulation. The low intermediate frequency enables low power receiver 30 to be designed with a relatively simple RF implementation and low current analog and digital circuits. Low power receiver 30 may suffer from poor image rejection, which can be improved by adaptively relocating the image frequency or with analog or digital compensation.

Antenna 25 receives a communication signal from a base station, such as base station 4 from FIG. 1, through a RF environment. LNA 26 then amplifies the received signal. Controller 22 detects conditions of the RF environment based on one or more characteristics of the received signal. Controller 22 then selects one of high performance receiver 28 and low power receiver 30 of adaptive receiver 20 to process the received signal based on the detected RF environment conditions.

For example, controller 22 may detect the strength of the received signal, a level of noise included in the received signal, and/or a strength of one or more jammer signals adjacent to the received signal to determine whether the RF environment is favorable or unfavorable. In some embodiments, controller 22 may detect an unfavorable RF environment when the received signal has a strength (e.g., RSSI) of less then −90 dBm and controller 22 may detect a favorable RF environment when the received signal has a strength of at least −90 dBm. The dBm notation represents a measured absolute power level in decibels relative to 1 milliwatt (mW).

When controller 22 detects an unfavorable RF environment based on the detected conditions, controller 22 closes switch 27 to couple high performance receiver 28 to LNA 26. In this case, high performance receiver 28 processes the received signal. When controller 22 detects a favorable RF environment based on the detected channel condition, controller 22 opens switch 27. In this case, LNA 26 is coupled to both high performance receiver 28 and low power receiver 30 via resistive power splitter 31.

Under favorable channel conditions, if high performance receiver 28 can withstand the extra loss, e.g., as determined by received signal strength, in-band noise estimate, and/or jammer strength, switch 27 is opened so that some of the received signal is diverted to low power receiver 30 via power splitter 31. For example, resistive power splitter 31 may be configured to direct a portion of the received signal power to high performance receiver 28 and another portion to low power receiver 30. In some cases, resistive power splitter 31 may consume a substantial portion of the received signal power, e.g., one-half, leaving the remaining signal power to be evenly split between high performance receiver 28 and low power receiver 30.

Once a portion of the signal is diverted to low power receiver 30, controller 22 can evaluate whether low power receiver will be able to reliably handle reception of the signal. For example, controller 22 may monitor one or more characteristics of the signal generated by low power receiver 30. During the evaluation, high performance receiver 28 continues to handle signal reception. Notably, in some embodiments, since high performance receiver 28 continues to handle signal reception, the operation and performance of low power receiver 30 may be optimized. Evaluation and optimization of low power receiver 30 may continue for an extended period of time until it is determined that conditions are unfavorable or the performance of low power receiver 30 is insufficient to take over handling of the signal.

For example, controller 22 may improve image rejection in low power receiver 30 with either digital or analog compensation. In addition, the intermediate frequency of the LIF low power receiver 30 may be changed, e.g., by exchanging high-side and low-side injection. As a further optimization step, the voltage or current supplied by critical elements may be increased to change the linearity and noise of low power receiver 30. In some embodiments, low power receiver 30 may include a variable attenuator stage between power splitter 31 and the input of the low power receiver. The variable attenuator may be adjusted to improve operation and performance of low power receiver 30.

Thus, as mentioned above, high performance receiver 28 may initially process the received signal while controller 22 of WCD 6 detects the channel conditions of the RF environment. Controller 22 may then configure low power receiver 30 while high performance receiver 28 processes the received signal. Once controller 22 determines that the RF environment is favorable, and low power receiver 30 is capable of reliably demodulating the received signal, controller 22 performs a hand-off from high performance receiver 28 to low power receiver 30.

Controller 22 may continue to configure low power receiver 30 until low power receiver 30 is capable of processing the received signal. In order to perform a hand-off to low power receiver 30, however, controller 22 sends the received signal to low power receiver 30 and shuts down high performance receiver 28. Low power receiver 30 then processes the received signal. Operation of low power receiver 30, instead of high performance receiver 28, can substantially reduce consumption of power supply 23 within WCD 6.

When low power receiver 30 is processing the received signal, controller 22 continues to detect conditions of the RF environment. If controller 22 determines that the RF environment has improved over the previously detected favorable conditions, LNA 26 may be bypassed by closing bypass switch 33. LNA 26 may then be shut down to further reduce consumption of power supply 23 within WCD 6. For example, controller 22 may bypass LNA 26 when the received signal has a strength (e.g., RSSI) of at least −80 dBm.

If controller 22 determines that the RF environment has become unfavorable, e.g., the received signal has a strength of less than −90 dBm, controller 22 restarts high performance receiver 30 and performs a hand-off from low power receiver 30 back to high performance receiver 28. High performance receiver 28 then processes the received signal. Therefore, high performance receiver 28 is only utilized when necessary in accordance with the detected conditions of the RF environment. The process of selectively applying high performance receiver 28 or low power receiver 30 may continue on a continuous or repetitive basis while WCD 6 is operating.

In some embodiments, WCD 6 may be configured to select different operating modes, e.g., in response to user input or network control. For example, WCD 6 may operate in a full-time, high performance mode in which high performance receiver 28 is always used. In a second, adaptive mode, WCD 6 may adaptively transition between high performance receiver 28 and low power receiver 30 based on channel conditions, as described in this disclosure. In a third mode, WCD 6 may be configured to operate in a full-time, low power mode in which only low power receiver 30 is used in order to aggressively conserve power resources, e.g., in a low battery state. The adaptive mode may be used under most conditions so that WCD 6 may transition between use of high performance receiver 28 and low power receiver 30 on a selective basis according to changing conditions in the RF environment.

Once high performance receiver 28 or low power receiver 30 processes the received signals according to conditions of the RF environment detected by controller 22, the respective receiver sends the processed signals to demodulator 32 to recover the data encoded within the received signals. In some embodiments, demodulator 32 may comprise a RAKE receiver. A RAKE receiver uses several baseband correlators, referred to as RAKE receiver fingers, to individually process several signal multipath components. The correlator outputs are combined to achieve improved communications reliability and performance. For example, the RAKE receiver may apply equal-gain combining or maximal ratio combining to produce output data based on the received signal.

Some broad observations may be made based on channel conditions in typical RF environments. First, the received signals typically have strengths of greater than approximately −88 dBm such that LNA 26 may infrequently (e.g., 10% probability or less) operate in a high gain state. Second, strong and effective jammers are rarely present in the received signals, causing high performance receiver 28 to often operate in a "low-nonlinearity" mode. Third, a level of in-band noise within the received signals is typically low due to hospitable frequencies near the desired channels of the received signals that accept the image frequency. Based on these observations, it can be assumed that adaptive receiver 20 of WCD 6 will typically operate in one of three receiver modes: the high performance receiver mode (mode 1), the low power receiver with LNA mode (mode 2), and the low power receiver without LNA mode (mode 3).

An illustration of the operation of adaptive receiver 20 will now be described. Particular levels or values are provided for purposes of illustration and should not be considered limiting of adaptive receiver 20 as broadly embodied and described in this disclosure. According to this illustration, upon receiving a signal via antenna 25, controller 22 opens switch 27 and selects low power receiver 30 to process the received signal when the received signal has a strength of at least −90 dBm. As stated above, signal strengths below −90 dBm occur infrequently with probability of less than approximately 10%. Therefore, WCD 6 only operates in receiver mode 1, in which high performance receiver 28 processes the received signal, with a probability of approximately 10%.

Controller 22 may bypass LNA 26 when the received signal has a strength of at least −80 dBm. The probability of the signal strength being between −90 dBm and −80 dBm is approximately 30%, although the probability may depend greatly on the situation. Therefore, WCD 6 only operates in receiver mode 2, in which low power receiver 30 processes the received signal and LNA 26 is active, with a probability of approximately 30%. WCD 6 then operates in receiver mode 3, in which low power receiver 30 processes the received signal and common LNA 26 is bypassed, when signal strength is better than −80 dBm, with a probability of approximately 60%.

Table 1, below, includes expected values for an example simulation of adaptive receiver 20. In this example, high performance receiver 28 corresponds generally to the receiver provided in the Qualcomm RFR6500 chip, available from Qualcomm, Incorporated, with the addition of LNA bypass, in which loss is reduced to 1 dBm to offset the loss of power splitter 31. Low power receiver 30, in this example, may be similar to the LIF receiver described in Bergveld et al., "A low-power highly-digitized receiver for 2.4-GHz-band GFSK applications," 2004 IEEE Radio Frequency Integrated Circuits Symposium, 2004, pages 347-350. An additional preamplifier may be provided in low power receiver 30. In particular, two LNAs may be cascaded in low power receiver 30. In addition, a variable attenuator may be provided to attenuate the input signal applied to low power receiver 30. Although the Bergveld LIF receiver is designed for Gaussian frequency shift keying (GFSK) modulation, the receiver is linear and so may be applicable to amplitude modulated signals.

Table 1 shows that, in mode 1, high performance receiver 28 is expected to consume approximately 213 milliwatts (mW). In mode 2, low power receiver 30 and LNA 26 is expected to consume approximately 62 mW. In mode 3, low power receiver 28, with LNA 26 off, is expected to consume approximately 36 mW. The average power consumption for each of the receiver modes can be determined based on the probability of WCD 6 operating in each of the receiver modes. The average power consumptions for each of the receiver modes are then summed to determine that the adaptive receiver 20 of WCD 6 consumes approximately 62 mW, given the expected values in this example.

Assuming power supply 23 is an 85% efficient switching power supply, the total power consumption amounts to approximately 20 milliamps (mA) from a 3.6 volt (V) battery. High performance receiver 28 alone, neglecting the current for LNA 26, may consume approximately 187 mW. In the case where power supply 23 is an 85% efficient switching power supply, the high performance receiver power consumption amounts to approximately 61 mA from a 3.6V battery. Therefore, the adaptive receiver techniques described herein can provide approximately a three-fold reduction in battery current compared to a conventional high performance receiver alone.

TABLE 1

|  |  | Mode 1 | Mode 2 | Mode 3 |
|---|---|---|---|---|
| High performance receiver | common LNA | 26 mW | 26 mW | 0 |
|  | receiver | 137 mW | 0 | 0 |
| High performance receiver baseband |  | 50 mW | 0 | 0 |
| Low power receiver plus baseband |  | 0 | 36 mW | 36 mW |
| Total |  | 213 mW | 62 mW | 36 mW |
| Probability |  | 0.1 | 0.3 | 0.6 |
| Average power |  | 21.3 mW | 18.6 mW | 21.6 mW |
| Total power |  |  | 61.5 mW |  |
| Battery current |  |  | 20 mA |  |

Figure 3A:
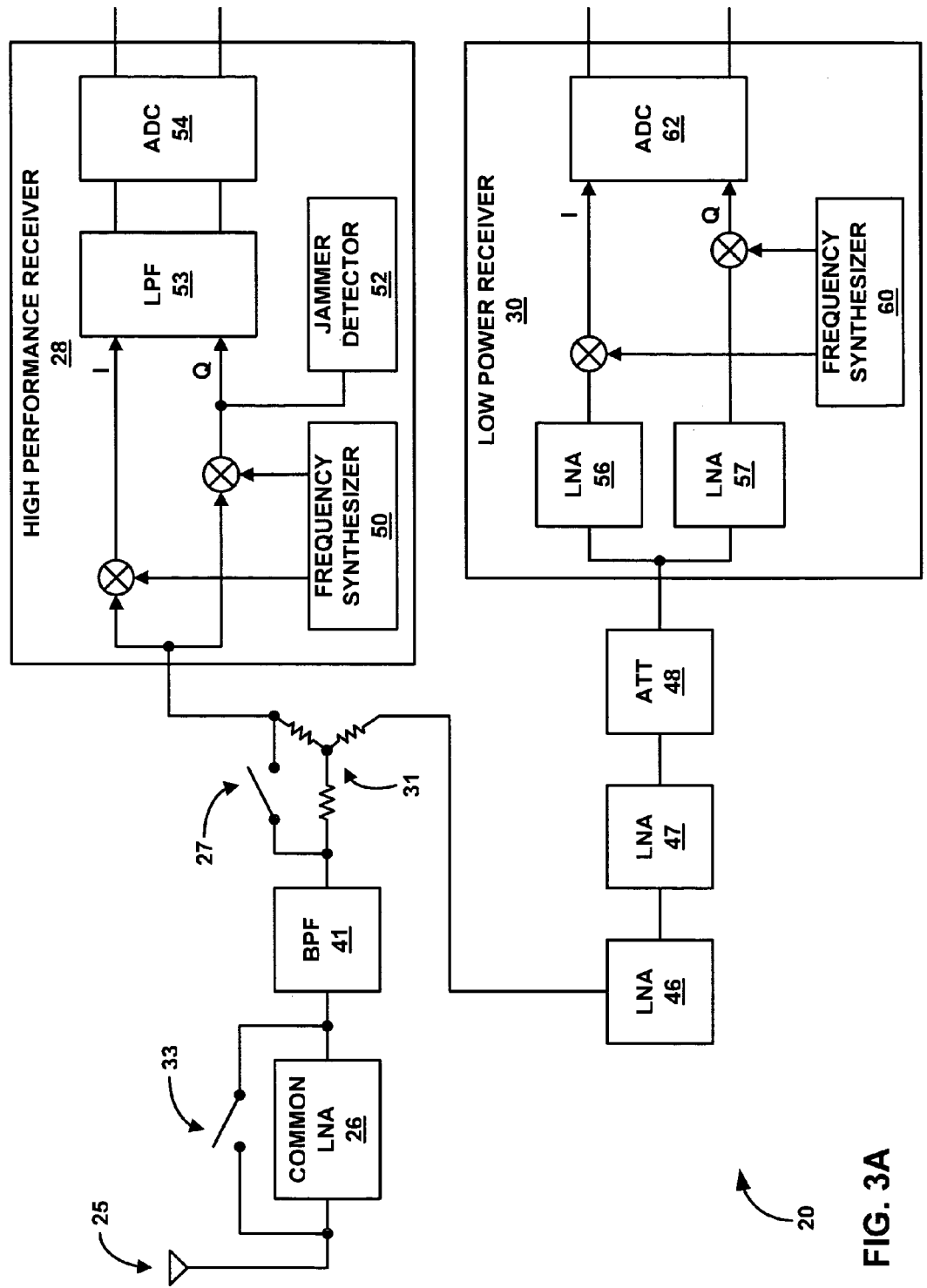
FIGS. 3A and 3B are block diagrams illustrating an exemplary embodiment of the WCD from FIG. 2 in greater detail.
Figure 3B:
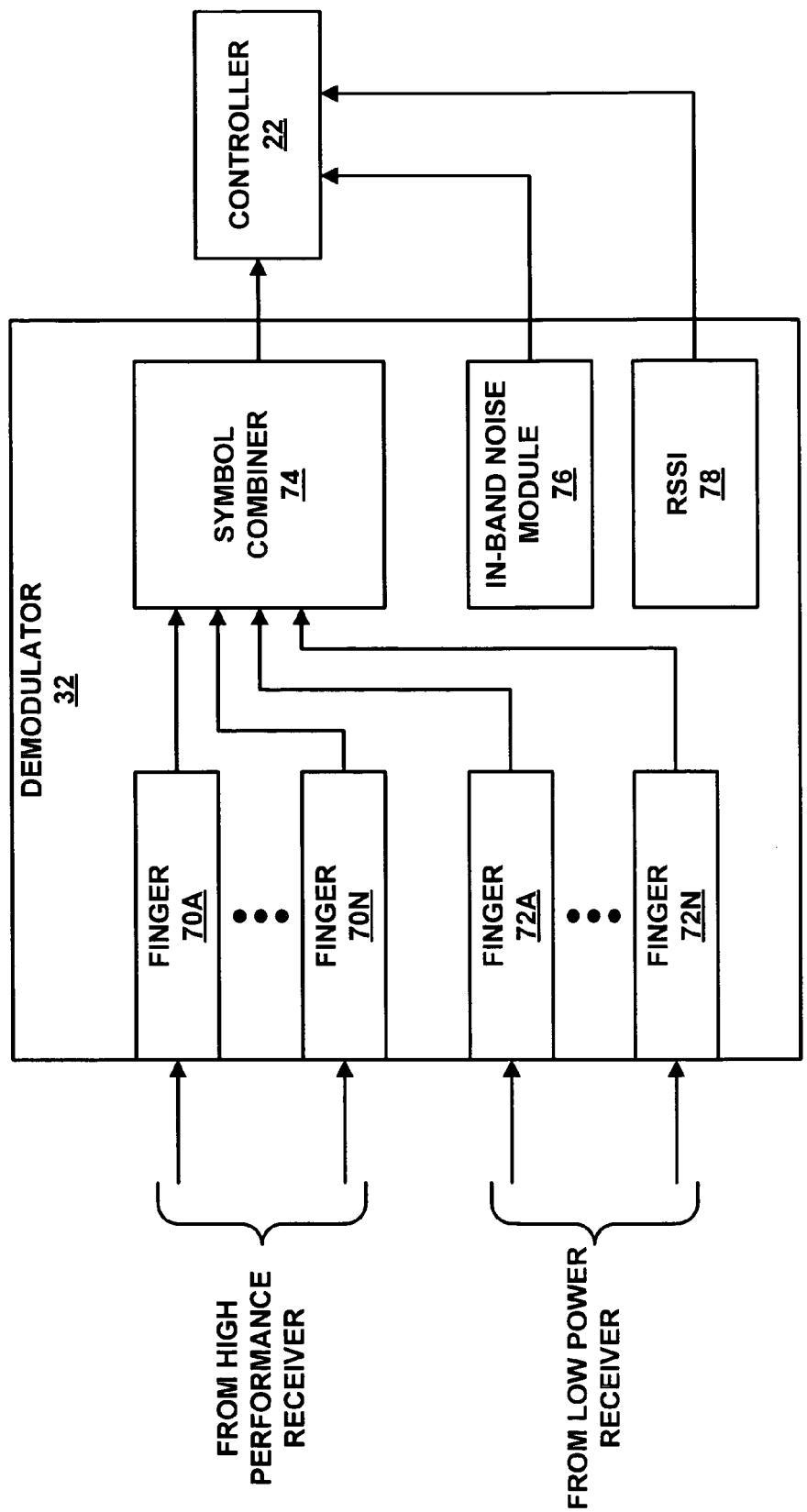

FIGS. 3A and 3B are block diagrams illustrating an exemplary embodiment of WCD 6 from FIG. 2 in greater detail. FIG. 3A illustrates high performance receiver 28 and low power receiver 30 coupled to each other via switch 27 and power splitter 31. Antenna 25 couples to high performance receiver 28 and low power receiver 30 via common LNA 26 or the bypass path when bypass switch 33 is closed. In FIG. 3A, duplexer 19 is omitted for ease of illustration. FIG. 3B illustrates the processed signals from high performance receiver 28 and low power receiver 30 feeding into demodulator 32. The output of demodulator 32 then feeds into controller 22.

Demodulator 32 may comprise a RAKE receiver. Demodulator 32 assigns demodulation elements, i.e., "fingers", to track multiple paths of the received signal. Demodulator 32 includes a first set of fingers 70A-70N (collectively "fingers 70") assigned to high performance receiver 28 and a second set of fingers 72A-72N (collectively "fingers 72") assigned to low power receiver 30. Fingers 70 and 72 receive and demodulate a digital baseband version of the received signal. In response to timing information received from controller 22, fingers 70 and 72 process the digital baseband version of the received signal to produce data bits. Demodulator 32 also includes a symbol combiner 74 that receives and combines the data bits from fingers 70 and fingers 71 to produce aggregate data for decoding the received signal into symbol information.

In a CDMA system, each RAKE finger 30 may include a despreader and a sequence generator that generates PN sequences according to a time offset supplied by controller 22. Each of fingers 70 and 72 may also include a number of components (not shown) for use in tracking and demodulating the assigned paths including filters, scaling and phase rotation circuitry, digital mixers and a Walsh sequence generator. By providing time offsets, controller 22 assigns each of fingers 70 and 72 to track and demodulate one of the paths of the received signal.

When antenna 25 receives a signal, common LNA 26 (FIG. 3A) amplifies the received signal when bypass switch 33 is open and sends the received signal to a band-pass filter (BPF) 41. The received signal may then initially be sent to high performance receiver 28 while controller 22 detects conditions of the RF environment. When high performance receiver 28 operates solely on the received signal, switch 27 is closed, bypassing power splitter 31. Upon an indication of favorable conditions, however, controller 12 may open switch 22 in an attempt to transition from high performance receiver 28 to low power receiver 30.

Three examples of indicators of the quality of the RF environment include signal strength, in-band noise and jammer strength. For example, controller 22 may utilize a received signal strength indicator (RSSI) 78 computed by demodulator 32 to detect the strength of the received signal. Controller 22 may utilize an in-band noise module 76 also included in demodulator 32 to detect the level of in-band noise within the received signal. Each of fingers 70 and 72 may estimate the in-band noise by first estimating and then subtracting the received signal from the expected signal to find the residual uncorrelated signal. Finally, controller 22 may utilize a jammer detector 52 included in high performance receiver 28 to detect the strength of one or more jammer signals by comparing the received signal with adjacent signals.

The design of high performance receiver 28 may be substantially similar to a conventional high performance receiver, such as the ZIF receiver in the Qualcomm RFR6500 chip. As mentioned previously, one modification to the conventional design may be the bypass mode of common LNA 26 in which loss is reduced to 1 dBm from 6 dBm to offset the loss of switch 27. High performance receiver 28 consumes approximately 187 mW and common LNA 26 consumes approximately 26 mW. If controller 22 detects an unfavorable RF environment, high performance receiver 28 processes the received signal.

In operation, high performance receiver 28 splits the received signal into an in-phase (I) component and a quadrature (Q) component. In particular, mixers 51A and 51B combine the received signal with signals from frequency synthesizer 50 to produce the I component and Q component, respectively. Both components are then sent to low-pass filer (LPF) 53, which feeds into analog-to-digital converter (ADC) 54. After the received signal is processed by high performance receiver 28, the received signal is transferred to demodulator 32, described in more detail in FIG. 3B. High performance receiver 28 also includes jammer detector 52, which detects strengths of one or more jammer signals adjacent to the received signal. In other embodiments, ADC 54 may comprise an individual component external to high performance receiver 28.

If controller 22 detects a favorable RF environment, controller 22 opens switch 27 to send a portion of the received signal to low power receiver 30 via power splitter 31. In this case, the signal power (less any amount consumed by power splitter 31) is shared between high performance receiver 28 and low power receiver 30. Controller 22 then configures low power receiver 30 until low power receiver 30 is capable of processing the received signal. For example, in order to configure low power receiver 30, controller 22 may improve image rejection of low power receiver 30 with either digital or analog compensation. Controller 22 may also change an intermediate frequency of low power receiver 30 by exchanging high-side and low-side local oscillator injection. In addition, controller 22 may change the linearity or noise of critical elements of low power receiver 30 or adjust variable attenuator 48 coupled to low power receiver 30.

Improvements in the ability of low power receiver 30 to process the received signal may be determined from the noise estimate of in-band noise module 76 or by direct comparison with the demodulated output of high performance receiver 28. Adaptive receiver 20 permits a low power receiver 30 to operate more often and thereby conserve more power within WCD 6 than high performance receiver 28. While the output of low power receiver 30 is evaluated by controller 22, high performance receiver 28 continues to handle processing of the received signal. Ultimately, if low power receiver 30 is capable of reliable reception of the signal, controller 22 turns off high performance receiver 28 so that the signal is handed off to low power receiver 30.

The design of low power receiver 30 may be substantially similar to the Bluetooth design of a LIF receiver, e.g., as described in the aforementioned Bergveld paper. As an example, low power receiver 30 may be configured in standard 0.18 μm CMOS that occupies a silicon area of approximately 3.5 mm$^2$ and consumes approximately 31.7 mW. An additional preamplifier may be included along the path from switch 27 to low power receiver 30 to further amplify the received signal. The additional preamplifier may be realized by an LNA 46 and an LNA 47 cascaded together, as shown in FIG. 3A.

Each of the combined LNAs 46, 47 consumes approximately 1.1 mW, and may conform generally to the LNA descried in the Bergveld paper. The additional preamplifier lowers the noise contribution of the components within low power receiver 30. Each of LNAs 46, 47 may provide a signal gain of approximately 12 dBm, noise figure of approximately 6 dBm, and an input third order intercept of approximately −16 dBm. Cascading LNA 46 and LNA 47 together then yields a gain of approximately 24 dBm, a noise figure of approximately 6.2 dBm, and an intercept of approximately −28 dBm.

In the example of FIG. 3A, the received signal also passes through a variable attenuator (ATT) 48 on the path between switch 27 and low power receiver 30. To account for the relatively large variations in the gain of the duplexer and the band-pass filter, variable attenuator 48 may be set during factory calibration. In one example, the variable attenuator 48 consumes approximately 1.8 mW, which brings the total power consumption for low power receiver 30 to approximately 35.7 mW. According to this example, variable attenuator 48 may have a minimum attenuation of approximately 1 dBm in the frequency bands of interest and occupies a silicon area of approximately 0.29 mm$^2$.

If controller 22 determines that low power receiver 30 is capable of handling the received signal, controller 22 performs a hand-off from high performance receiver 28 to low power receiver 30. In this case, controller 22 may shut down high performance receiver 28 to substantially reduce power consumption. Low power receiver 30 then processes the received signal. For example, low power receiver 30 splits the received signal into an in-phase (I) component and a quadrature (Q) component. Low power receiver includes a LNA 56 for a first branch of the received signal and another LNA 57 for a second branch of the received signal. Mixers 55A, 55B then combine the received signal with signals from frequency synthesizer 60. Mixer 55A produces an in-phase (I) component of the received signal. Mixer 55B produces a quadrature phase (Q) component of the received signal. The resulting I and Q component signals are sent to ADC 62, as further shown in FIG. 3A. After the received signal is processed by low power receiver 30, the received signal is transferred to demodulator 32, described in more detail in FIG. 3B. Many functions within low power receiver 30 may be present on-chip, including LNAs 56 and 57, ADC 62, a bandgap reference, and a crystal oscillator.

While low power receiver 30 processes the received signal, controller 22 continues to detect conditions of the RF environment. Should conditions improve further, controller 30 may bypass common LNA 26 by closing bypass switch 33, thereby shutting down common LNA 26 to conserve additional power. The opportunity to shut down high performance receiver 28 and common LNA 26 may be increased when WCD 6 includes an additional diversity receiver with a separate antenna that operates cooperatively with low power receiver 30. For example, another receiver identical or similar to low power receiver 30 may be provided with another antenna to support diversity reception.

When controller 22 determines that the RF environment has become unfavorable while low power receiver 30 is processing the received signal, controller 22 performs a hand-off from low power receiver 30 back to high performance receiver 28. For example, controller 22 may close switch 27 to hand off signal processing from low power receiver 30 to high performance receiver 28. Controller 22 may utilize in-band noise module 76 within demodulator 32 to track a slowly deteriorating RF environment. For a rapidly changing environment, controller 22 may monitor the power at the output of ADC 62 within low power receiver 30. In marginal conditions, low power receiver 30 operates with a low carrier-to-noise ratio where the noise level is comparable to the received signal. Therefore, an increase in noise will cause a measurable increase in total power within low power receiver 30.

Figure 4:
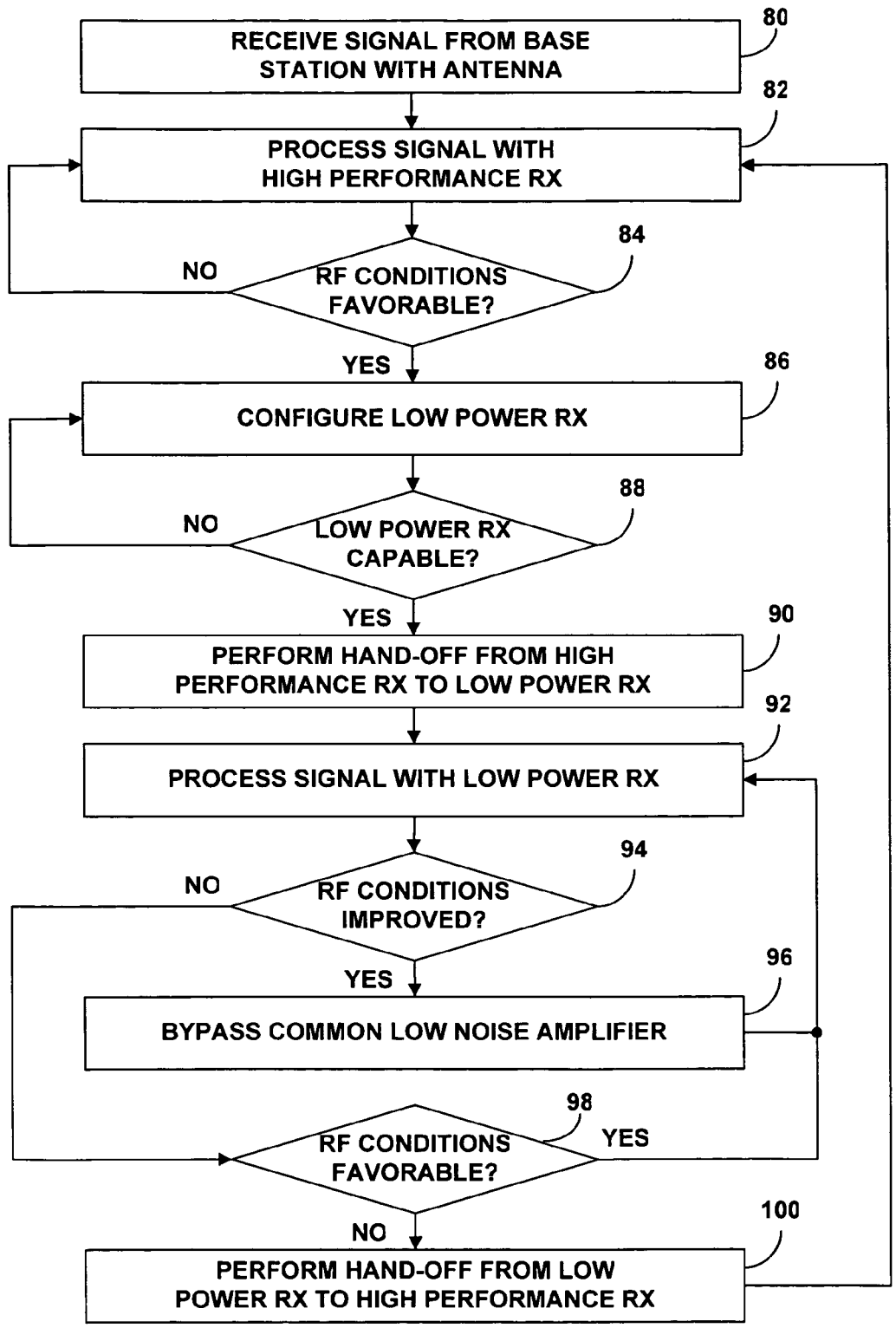
FIG. 4 is a flow diagram illustrating exemplary operation of the WCD of FIG. 2.

FIG. 4 is a flow chart illustrating an exemplary operation of adaptive receiver 20 in WCD 6. The operation will be described with reference to WCD 6 of FIG. 2. Antenna 25 receives signals from a base station through an RF environment (80). High performance receiver (RX) 28 initially processes the received signal (82). For example, high performance receiver 28 may initially be selected upon power-up of WCD 6 or upon initiation of an incoming or outgoing voice or data call. For selection of high performance receiver 28 or low power receiver 30, controller 22 detects conditions of the RF environment (84).

For example, controller 22 may detect the conditions of the RF environment based on a detected strength of the received signal, a detected level of noise included in the received signal, and a detected strength of one or more jammer signals adjacent to the received signal. Controller 22 may utilize RSSI 78 within demodulator 32 to detect the strength of the received signal and in-band noise module 76 within demodulator 32 to detect the level of noise included in the received signal by comparing the received signal with an expected signal. In addition, controller 22 utilizes a jammer detector within high performance receiver 28 that detects the strength of one or more jammer signals by comparing the received signal with the adjacent signals.

When controller 22 detects an unfavorable RF environment, e.g., based on RSSI, in-band noise, and/or strong jammer presence, the high performance receiver continues to process the received signal (82). When controller 22 detects a favorable RF environment, the controller opens switch 27 and sends a portion of the received signal to low power receiver 30 via power splitter 31. Controller 22 then configures low power receiver 30 (86). For example, controller 22 may improve image rejection of low power receiver 30, change an intermediate frequency of low power receiver 30, change linearity of critical elements of low power receiver 30, or adjust variable attenuator 48 coupled to low power receiver 30. Controller 22 may configure low power receiver (RX) 30 until low power receiver 30 is capable of reliable processing the received signal (88).

Controller 22 may evaluate the output of low power receiver 30 to determine whether acceptable receiver performance can be obtained. Reliable performance of low power receiver 30 may be determined from the in-band noise estimate for signals produced by the low power receiver, or by direct comparison with the demodulated output of high performance receiver 28, or both.

For example, controller 22 may compare the in-band noise estimate for low power receiver 30 to a threshold level, and determine that performance is acceptable based on the comparison. Additionally, or alternatively, controller 22 may compare the demodulated outputs of high performance receiver 28 and low power receiver 30 to determine a margin of error between the outputs. If the output of low power receiver 30 is within an acceptable margin of error of the output of high performance receiver 28, then it may be judged that low power receiver 30 is capable of reliable operation.

If low power receiver 30 is not capable of reliably processing the received signal (88), controller 22 continues to attempt to configure the low power receiver while high performance receiver 28 maintains responsibility for processing the incoming signals. However, efforts to configure low power receiver 30 may be subject to a time-out or some other termination condition. Upon reaching a time-out or termination condition, controller 22 may close switch 27 to return to sole operation by high performance receiver 28, e.g., until for favorable conditions are detected.

If low power receiver 30 is capable of processing the received signal, controller 22 performs a hand-off from high performance receiver 28 to low power receiver 30 (90). In order to perform a soft hand-off to low power receiver 30, controller 22 sends the received signal to low power receiver 30 via power splitter 31 and shuts down high performance receiver 28. Low power receiver 30 then processes the entire received signal (92). Controller 22 continues to detect conditions of the RF environment while low power receiver 30 processes the received signal (94).

If the RF environment improves from the previously detected favorable conditions, common LNA 26 may be bypassed by closing bypass switch 33 (96). Bypassing common LNA 26 may further reduce the power consumption within WCD 6. If the RF environment does not improve, but continues to be favorable (yes branch of 98), low power receiver 30 continues to process the received signal (92). If the RF environment does not improve and actually becomes unfavorable (no branch of 98), controller 22 performs a hand-off from low power receiver 30 to high performance receiver 28 (100), e.g., by closing switch 27 and shutting down low power receiver 30. High performance receiver 28 then processes the received signal (82).

High performance receiver 28 and low power receiver 30 use the same antenna 25 in the examples of FIGS. 2 and 3. In alternative embodiments, however, low power receiver 30 may be coupled to its own antenna, separate from the antenna coupled to high performance receiver 28. In this case, high performance receiver 28 and low power receiver 30 are placed in different, parallel receive paths and do not share the same input LNA 26 and rely on a power splitter 31. Instead, controller 22 may perform a hand-off between low-power receiver 30 and high performance receiver 28 by selectively activating and deactivating the receivers. The operation of controller 22 and adaptive receiver 20 may otherwise be similar to the operation described in this disclosure.

Various embodiments have been described. For example, adaptive receivers for WCDs are described such that a high performance receiver processes a received signal when the RF environment is unfavorable and a low power receiver processes the received signal when the RF environment is favorable. The techniques described herein may substantially reduce power consumption within WCDs. These and other embodiments are within the scope of the following claims.

The invention claimed is:

1. A method comprising:
   receiving a wireless signal;
   evaluating at least one channel condition associated with the wireless signal; and
   selecting one of a high performance receiver and a low power receiver to process the received signal based on the evaluation and when the low power receiver is selected, continuing to process the received signal with the high performance receiver while the low power receiver receives at least a portion of the signal during configuration of the low power receiver.

2. The method of claim 1, further comprising processing the received signal with the high performance receiver when the channel condition is unfavorable.

3. The method of claim 1, further comprising processing the received signal with the low power receiver when the channel condition is favorable.

4. The method of claim 1, wherein evaluating the channel condition comprises detecting a strength of the received signal, a level of noise included in the received signal, and a strength of at least one jammer signal adjacent to the received signal.

5. The method of claim 1, wherein evaluating the channel condition comprises generating a received signal strength indication (RSSI) for the received signal, comparing the RSSI to a threshold RSSI level, and evaluating the channel condition based on the comparison.

6. The method of claim 1, wherein evaluating the channel condition comprises generating an in-band noise level for the received signal, comparing the in-band noise level to a threshold noise level, and evaluating the channel condition based on the comparison.

7. The method of claim 1, wherein evaluating the channel condition comprises generating a strength level of at least one jammer signal for the received signal, comparing the strength level to a threshold strength level, and evaluating the channel condition based on the comparison.

8. The method of claim 1, wherein the high performance receiver within the WCD comprises a zero intermediate frequency (ZIF) receiver, and wherein the low power receiver within the WCD comprises a low intermediate frequency (LIF) receiver.

9. The method of claim 1, wherein selecting one of the high performance receiver and the low power receiver comprises:
   feeding the received signal to the high performance receiver when the channel condition is unfavorable; and
   feeding a first portion of the received signal to the high performance receiver and a second portion of the received signal to the low power receiver via a power splitter and shutting down the high performance receiver when the channel condition is favorable.

10. The method of claim 1, further comprising initially processing the received signal with the high performance receiver during evaluation of the channel condition.

11. The method of claim 1, further comprising:
    initially processing the received signal with the high performance receiver during evaluation of the channel condition;
    feeding the received signal to the high performance receiver when the channel condition is unfavorable; and
    feeding a first portion of the received signal to the high performance receiver and a second portion of the received signal to the low power receiver via a power splitter when the channel condition is favorable.

12. The method of claim 11, further comprising:
    upon feeding the first portion of the received signal to the high performance receiver and the second portion of the received signal to the low power receiver via the power splitter, configuring the low power receiver.

13. The method of claim 12, wherein configuring the low power receiver comprises at least one of improving image rejection of the low power receiver, changing an intermediate frequency of the low power receiver, changing linearity of critical elements of the low power receiver, and adjusting a variable attenuator coupled to the low power receiver.

14. The method of claim 12, further comprising, upon configuration of the low power receiver, determining whether the low power receiver is capable of reliably processing the received signal using the portion of the received signal fed to the low power receiver.

15. The method of claim 14, further comprising, upon determining that the low power receiver is capable of reliably processing the received signal, shutting down the high performance receiver to hand-off signal processing from the high performance receiver to the low power receiver.

16. The method of claim 15, further comprising evaluating the channel condition while processing the received signal with the low power receiver.

17. The method of claim 16, wherein the high performance receiver and the low power receiver utilize a common low noise amplifier, the method further comprising bypassing the common low noise amplifier when the channel condition exceeds a threshold level.

18. The method of claim 16, further comprising performing a hand-off from the low power receiver to the high performance receiver when the channel condition becomes unfavorable.

19. The method of claim 1, further comprising demodulating an output of the high performance receiver via a first plurality of RAKE fingers in a RAKE demodulator, and demodulating an output of the low power receiver via a second plurality of RAKE fingers in the RAKE demodulator.

20. A wireless communication device (WCD) comprising:
    an antenna that receives a wireless signal;
    a high performance receiver coupled to the antenna;
    a low power receiver coupled to the antenna; and
    a controller that evaluates at least one channel condition associated with the wireless signal, and selects one of the high performance receiver and the low power receiver to process the received signal based on the evaluation and when the low power receiver is selected, providing at least a portion of the signal to the low power receiver for configuration thereof while continuing to process the received signal with the high performance receiver during configuration of the low receiver.

21. The device of claim 20, wherein the controller selects the high performance receiver to process the received signal when the channel condition is unfavorable.

22. The device of claim 20, wherein the controller selects the low power receiver to process the received signal when the channel condition is favorable.

23. The device of claim 20, wherein, to evaluate the channel condition, the controller detects a strength of the received signal, a level of noise included in the received signal, and a strength of at least one jammer signal adjacent to the received signal.

24. The device of claim 20, wherein, to evaluate the channel condition, the controller generates a received signal strength indication (RSSI) for the received signal, compares the RSSI to a threshold RSSI level, and evaluates the channel condition based on the comparison.

25. The device of claim 20, wherein, to evaluate the channel condition, the controller generates an in-band noise level for the received signal, compares the in-band noise level to a threshold noise level, and evaluates the channel condition based on the comparison.

26. The device of claim 20, wherein, to evaluate the channel condition, the controller generates a strength level of at least one jammer signal for the received signal, compares the strength level to a threshold strength level, and evaluates the channel condition based on the comparison.

27. The device of claim 20, wherein the high performance receiver within the WCD comprises a zero intermediate frequency (ZIF) receiver, and wherein the low power receiver within the WCD comprises a low intermediate frequency (LIF) receiver.

28. The device of claim 20, further comprising:
a switch, controlled by the controller, that feeds the received signal to the high performance receiver in a first switch state when the channel condition is unfavorable; and
a power splitter that feeds a first portion of the received signal to the high performance receiver and a second portion of the received signal to the low power receiver when the switch is in a second switch state,
wherein the controller shuts down the high performance receiver when the channel condition is favorable.

29. The device of claim 20, wherein the high performance receiver initially processes the received signal during evaluation of the channel condition.

30. The device of claim 20, wherein the high performance receiver initially processes the received signal during evaluation of the channel condition, the device further comprising:
a switch, controlled by the controller, that feeds the received signal to the high performance receiver in a first switch state when the channel condition is unfavorable; and
a power splitter that feeds a first portion of the received signal to the high performance receiver and a second portion of the low power receiver when the switch is in a second switch state when the channel condition is favorable.

31. The device of claim 30, wherein the controller configures the low power receiver while the first portion of the received signal is fed to the high performance receiver and the second portion of the received signal is fed to the low power receiver via the power splitter.

32. The device of claim 31, wherein, to configure the low power receiver, the controller performs at least one of improving image rejection of the low power receiver, changing an intermediate frequency of the low power receiver, changing linearity of critical elements of the low power receiver, or adjusting a variable attenuator coupled to the low power receiver.

33. The device of claim 31, wherein the controller, upon configuration of the low power receiver, determines whether the low power receiver is capable of reliably processing the received signal using the portion of the received signal fed to the low power receiver.

34. The device of claim 33, wherein the controller, upon determining that the low power receiver is capable of reliably processing the received signal, shuts down the high performance receiver to hand-off signal processing from the high performance receiver to the low power receiver.

35. The device of claim 34, wherein the controller evaluates the channel condition while processing the received signal with the low power receiver.

36. The device of claim 35, wherein the high performance receiver and the low power receiver utilize a common low noise amplifier, the device further comprising a bypass switch to bypass the common low noise amplifier when the channel condition exceeds a threshold level.

37. The device of claim 36, wherein the controller performs a hand-off from the low power receiver to the high performance receiver when the channel condition becomes unfavorable.

38. The device of claim 20, further comprising a RAKE demodulator having a first plurality of RAKE fingers coupled to an output of the high performance receiver, and a second plurality of RAKE fingers coupled to an output of the low power receiver.

39. A wireless communication device (WCD) comprising:
an antenna that receives a wireless signal;
a high performance zero intermediate frequency (ZIF) receiver coupled to the antenna;
a low power low intermediate frequency (LIF) receiver coupled to the antenna;
a RAKE demodulator have a first plurality of fingers coupled to an output of the high performance ZIF receiver and a second plurality of fingers coupled to an output of the low power LIF receiver; and
a controller that evaluates at least one channel condition associated with the wireless signal, selects the low power LIF receiver to process the received signal when the channel condition is favorable, and selects the high performance ZIF receiver to process the received signal when the channel condition is unfavorable.

40. The device of claim 39, wherein the at least one channel condition includes at least one of received signal strength, signal noise, or jammer strength.

* * * * *